June 19, 1962     W. L. GANSKE     3,039,878

PRE-MIX MANUFACTURING PROCESS

Filed Jan. 26, 1959

United States Patent Office 3,039,878
Patented June 19, 1962

3,039,878
PRE-MIX MANUFACTURING PROCESS
Warren L. Ganske, Minneapolis, Minn., assignor to The Pillsbury Company, Minneapolis, Minn., a corporation of Delaware
Filed Jan. 26, 1959, Ser. No. 788,921
3 Claims. (Cl. 99—94)

This is a continuation in part of co-pending application Serial Number 591,472, filed June 14, 1956. The invention relates to the manufacture of improved culinary pre-mixes and more particularly to a method which permits the use of fluid shortening in their preparation.

Virtually every baking pre-mix contains flour and shortening. Probably the most well known of these is the layer cake pre-mix although there are many others including bread mixes, pie-crust mixes, biscuit mixes and roll mixes. It is essential that these pre-mixes be in dry powdered, free flowing condition when put to use by the consumer and experience has shown that the use of liquid oils as the shortening component precludes the production of a free flowing product. Thus, it has long been considered essential to process the shortening component into a relatively solid or plastic condition prior to incorporating it into the pre-mix.

In general the present process for manufacturing these pre-mixes involves blending together all of the dry ingredients in their required proportions and then "cutting in" the requisite amount of a plastic or relatively solid shortening. The entire mass is then blended together as well as possible with some suitable mixing equipment such as a ribbon mixer.

This process accomplishes reasonably satisfactory blending but it leaves the mix laden with isolated aggregates of flour and fat which are identified by those skilled in the art as "pills." Accordingly it is necessary to process the materials a second time to eliminate these "pills." Thus, the known processes which are presently used by pre-mix manufacturers contain many disadvantages. These processes are limited to batch operations and are therefore inefficient and expensive. Moreover they require the use of excessive quantities of ingredients and cannot be relied upon to produce a uniform product.

The instant invention overcomes all of these disadvantages and provides additional improvements to the pre-mix manufacturing art.

I have discovered a process according to which I can manufacture any of the flour-shortening baking pre-mixes on a continuous basis. Moreover the process of my invention permits the use of fluid shortening thereby eliminating the necessity and expense of plasticizing the shortening component. I have also found that my process provides a substantially improved product to the consumer and at the same time permits the manufacturer to achieve substantial efficiency and cost reduction.

In general my process comprises a system wherein the dry pulverulent components of the pre-mix such as flour, sugar and leavening are continuously blended together in the required proportions and then fluidized and combined, by impaction, with a finely divided fluid shortening, which may be either a liquid oil or a melted fat, at a rate sufficient to produce an intimate mixture of shortening particles and dry ingredients in the proportion required by the particular pre-mix being produced.

As the stream of fluidized dry ingredients is brought together with the shortening particles they become an integrated constituent of the stream of fluidized particles. At this point the fluidized mixture comprises a thorough blend of all the pre-mix ingredients and immediately thereafter the fluid shortening particles are imbibed by or adsorbed onto the dry particles thus producing a uniformly blended pill free pre-mix which is then defluidized to produce a dry powdered free flowing product.

The process of the instant invention is diagrammatically represented in the drawings wherein.

Figure 1:
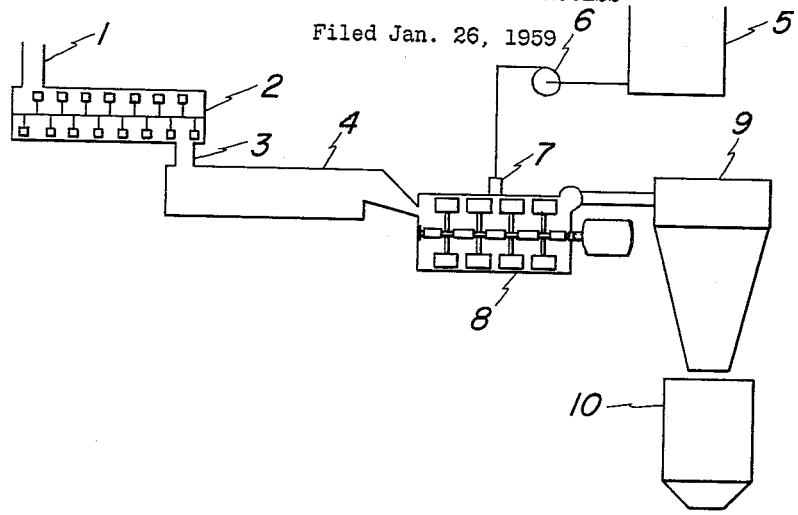
FIGURE 1 illustrates the use of a high speed mixer (manufactured and sold under the trademark Turbolizer by the Strong-Scott Manufacturing Company, Minneapolis, Minnesota) to accomplish fluidization.

In FIGURE 1 the dry ingredients of the pre-mix are continuously fed through conduit 1 into mixing screw 2. The dry ingredients then pass through conduit 3 into gravimetric feeder 40 which continuously proportions them into fluidizer 8. Concurrent with the introduction of the dry ingredients into the fluidizer, fluid shortening, contained in tank 5, is continuously metered through pump 6 into nozzle 7 which injects the shortening into the fluidizer. The finely divided shortening then contacts the fluidized dry ingredients and becomes thoroughly intermixed therewith to produce a pre-mix in fluidized condition. The pre-mix then passes from the fluidizer into cyclone 9 where it is defluidized and discharged into bin 10.

Figure 2:
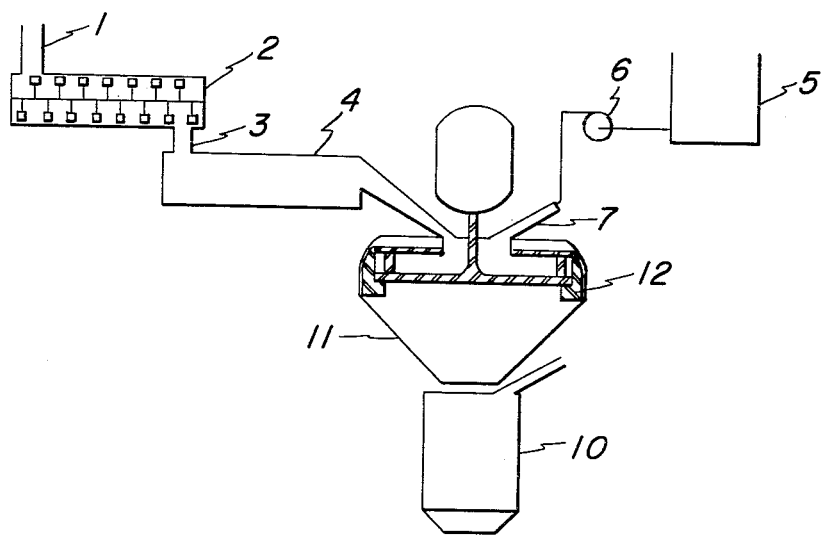
FIGURE 2 illustrates the use of an impact mill (manufactured and sold under the trademark Entoleter by Safety Industries Inc., Boston, Massachusetts) to accomplish fluidization.

In FIGURE 2 the dry ingredients of the pre-mix are continuously fed through conduit 1 into mixing screw 2. They are then channeled through conduit 3 into gravimetric feeder 4 which continuously proportions them into fluidizer 11, which has been modified by the addition of two radially positioned fan blades 12 to the rotor member to improve fluidization. Fluid shortening from tank 5 is simultaneously metered through pump 6 into nozzle 7 which introduces it into fluidizer 11 where the finely divided shortening becomes integrated with the fluidized dry ingredients to produce a complete, fluidized pre-mix. The pre-mix then passes into the lower, cone-shaped portion of the entoleter where it is defluidized and discharged into bin 10.

The instant invention is further illustrated by the following examples:

Example I

Utilizing the processing system illustrated in FIGURE 1 of the drawing, I prepared a white cake pre-mix comprising 44.85% sugar, 40.00% flour, 10.5% shortening, 2.5% leavening and 2.15% minor flavoring ingredients. The sugar was continuously metered into the mixing screw at the rate of 33.70 pounds per minute, flour was metered in at the rate of 33.00 pounds per minute and the leavening and minor flavoring ingredients were metered in at the rate of 3.45 pounds per minute. The composite dry ingredients were then continuously fed into the fluidizer at the rate of 70.15 pounds per minute. Simultaneously with the introduction of the dry ingredients into the fluidizer, fluid shortening was pumped in at the rate of 7.85 pounds per minute. The fluidization of the pre-mix ingredients was accomplished by operating the fluidizer at a speed of 2600 r.p.m. The pre-mix thus produced was then immediately discharged into a storage bin.

Samples of the pre-mix were baked into cakes. In preparing these cakes 18 ounces of pre-mix were combined with 1⅓ cups of water and blended to form a batter. This batter was then placed in two 9 inch cake tins and baked at 375° F. for 25 minutes.

The cakes thus prepared were rated superior to conventionally prepared cakes in all respects.

Example II

Again utilizing the processing system illustrated in FIGURE 1 a hot roll pre-mix comprising 86.0% flour, 4.0% sugar, 7.0% shortening, 2.0% leavening and 1.0% salt was prepared. The flour component was continuously fed into the mixing screw at the rate of 64.5 pounds per minute, the sugar was fed in at the rate of 3.0 pounds per minute and the leavening and salt was fed in at the rate of 2.25 pounds per minute. The composite mixture of dry ingredients was then fed into the fluidizer at the rate of 69.75 pounds per minute and the shortening was fed in at the rate of 5.25 pounds per minute. Fluidization was accomplished by operating the apparatus at 2600 r.p.m. As the premix was produced it was continuously discharged into a storage bin. Representative samples of this pre-mix were baked and evaluated.

In preparing hot rolls from this pre-mix 7 grams of dry, inactive yeast was blended with 1 cup of warm water and 14 ounces of pre-mix was then combined with the yeast and water and mixed to form a dough. After proofing for 45 minutes the dough was cut into a plurality of pieces, placed in a muffin pan and baked at a temperature of 400° F. for 15 minutes. The baked rolls produced were judged to be superior in all respects to rolls produced from conventionally prepared pre-mixes.

*Example III*

Five-hundred pounds of yellow cake pre-mix was prepared utilizing the processing system illustrated in FIGURE 2. This pre-mix comprised 44% sugar, 40% flour, 10% shortening, 2.5% leavening and 3.5% coloring and flavoring. The processing conditions outlined in Example No. I were repeated here except that the fluidizing apparatus was operated at 3600 r.p.m. Again the mix was continuously discharged into a storage bin and quantities were baked and evaluated.

The cakes produced from this pre-mix were also substantially superior to products prepared from conventionally manufactured yellow cake pre-mixes.

Various other culinary pre-mixes have also been produced with the process of the instant invention. Among these are pie-crust mixes, cookie mixes, biscuit mixes and a wide variety of cake mixes including chocolate, caramel and spice.

The discovery that culinary pre-mixes could be produced by combining the dry ingredients with the shortening while the dry ingredients were in a fluidized condition and the shortening was in a fluid and finely divided condition has lead to very substantial improvements in product qualities. Furthermore, since the process may be carried out on a continuous basis, may be automatically controlled and may be accomplished with a variety of apparatus it provides the manufacturer with a large reduction in production cost.

I claim:
1. The method of making a culinary pre-mix comprising flour and shortening, said method comprising;
   fluidizing said flour;
   introducing said shortening into said flour in finely divided fluid state and in predetermined proportion thereto while said flour is fluidized;
   admixing said flour and said shortening, by impaction, while said flour is fluidized, to thereby produce a pill-free pre-mix in fluidized condition;
   and then defluidizing said pre-mix.
2. The method of making a culinary pre-mix comprising flour, sugar and shortening, said method comprising;
   admixing the pulverulent components of said pre-mix in predetermined proportions;
   fluidizing said admixture of pulverulent components;
   introducing said shortening into said admixture of pulverulent components in finely divided fluid state and in predetermined proportion thereto while said admixture of pulverulent components is fluidized;
   admixing said admixture of pulverulent components and said shortening, by impaction, while said admixture of pulverulent components is fluidized, to thereby produce a pill-free pre-mix in fluidized condition;
   and then defluidizing said pre-mix.
3. The method of making a culinary pre-mix comprising flour, sugar and shortening, said method comprising;
   admixing the pulverulent components of said pre-mix in predetermined proportions;
   fluidizing said admixture of pulverulent components;
   introducing said shortening into said admixture of pulverulent components in finely divided fluid state and in predetermined proportion thereto while said admixture of pulverulent components is fluidized;
   admixing said admixture of pulverulent components and said shortening, by impaction, while said admixture of said pulverulent components is fluidized, to thereby produce a pill-free pre-mix in fluidized condition;
   defluidizing said pre-mix;
   and discharging said defluidized pre-mix into a container.

References Cited in the file of this patent
UNITED STATES PATENTS

| | | |
|---|---|---|
| 1,948,871 | Quehl | Feb. 27, 1934 |
| 2,835,588 | Alexander et al. | May 20, 1958 |
| 2,874,053 | Mills | Feb. 17, 1959 |

OTHER REFERENCES

"American Miller and Processor," vol. 71, No. 1 (January 1948), page 81.